United States Patent [19]

Kakihara et al.

[11] 4,251,691
[45] Feb. 17, 1981

[54] PICTURE/AUDIO SIGNAL TRANSMISSION SYSTEM

[75] Inventors: Hideto Kakihara, Higashiyamato; Kenichi Hiratsuka, Urawa; Yoji Shibata; Wataru Kosuge, both of Yokohama, all of Japan

[73] Assignees: Nippon Telegraph and Telephone Public Corporation; Hitachi, Ltd., both of Japan

[21] Appl. No.: 965,602

[22] Filed: Dec. 1, 1978

[30] Foreign Application Priority Data

Dec. 2, 1977 [JP] Japan .................... 52-143968

[51] Int. Cl.³ ........................... H04M 11/00
[52] U.S. Cl. ............................. 179/2 TV
[58] Field of Search ............ 179/2 TV, 2 TS; 358/85

[56] References Cited

U.S. PATENT DOCUMENTS

| 3,226,484 | 12/1965 | James | 179/2 TV |
| 3,587,053 | 6/1971 | Horzepa et al. | 179/2 TV |

Primary Examiner—Bernard Konick
Assistant Examiner—Joseph A. Popek
Attorney, Agent, or Firm—Craig & Antonelli

[57] ABSTRACT

A center-to-end type information service system utilizing the public telephone networks that are fundamental communication media of nation-wide scale is disclosed in which desired information is requested from the terminal side to the center by means of a telephone set or simplified keyboard and then delivered to and received by a TV receiver. A part of the center functions is transferred together with the exchange function to a subcenter located near the terminal. Thus, the length of transmission path connecting the center to terminals becomes shorter and the cost of the whole system can be cut down.

4 Claims, 9 Drawing Figures

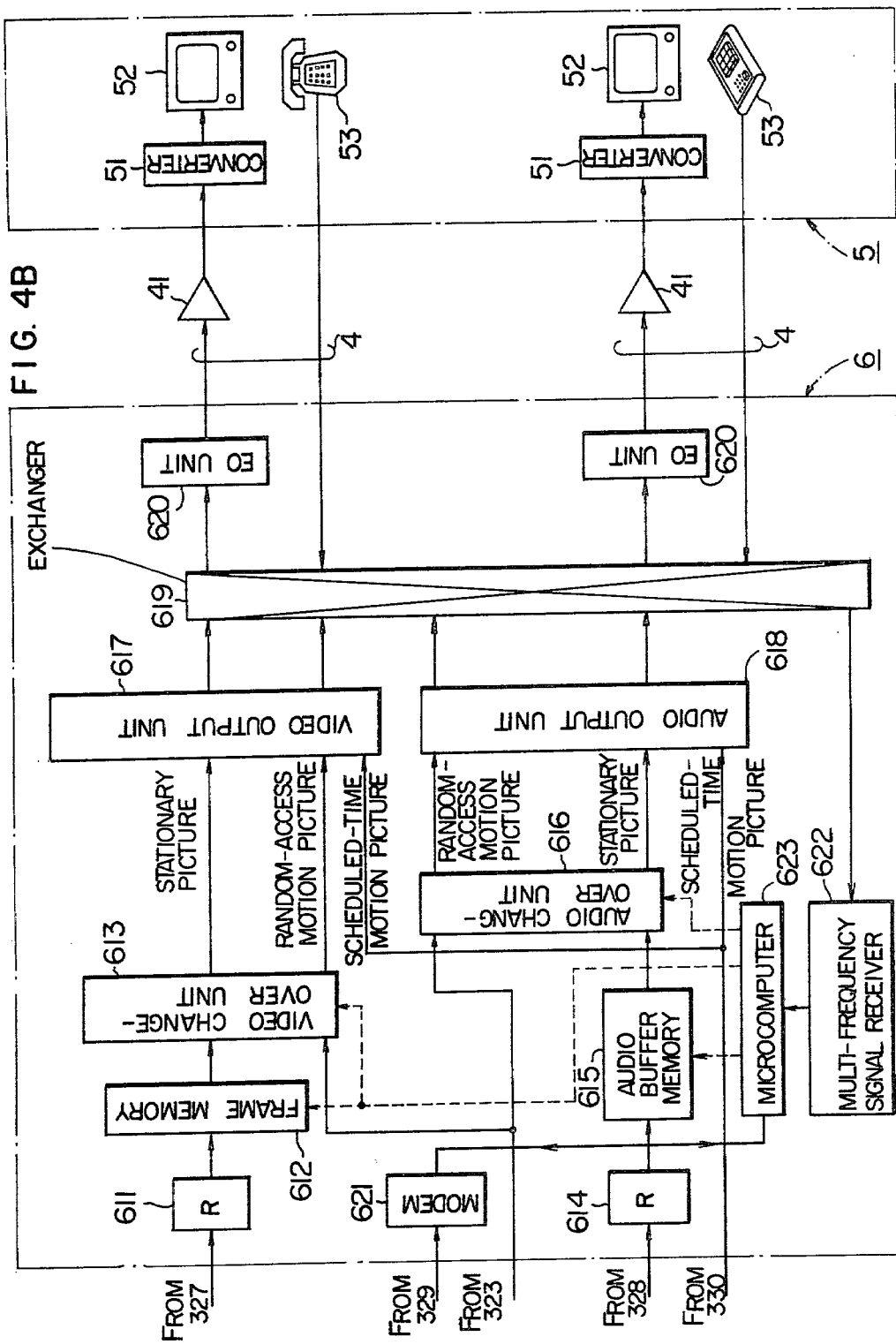

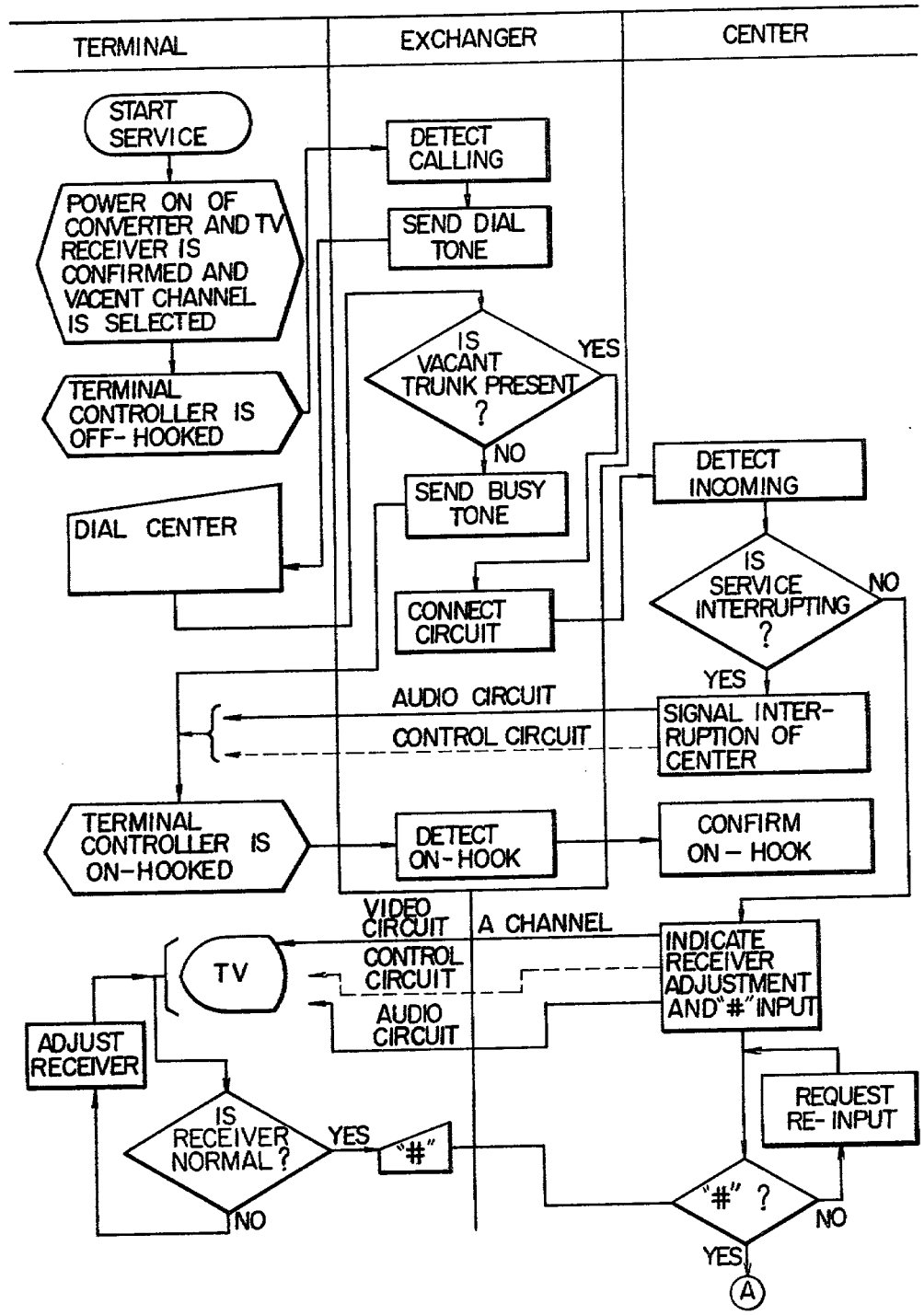

PICTURE/AUDIO SIGNAL TRANSMISSION SYSTEM

BACKGROUND OF THE INVENTION

In correspondence with the increasing requirement for variety and propriety of information, multiple information service systems have been developed in many countries which can provide various information such as picture image or data through a wideband large-capacity communication network. For such systems, there has been considered the multipurpose utilization of fundamental media such as broadcasting waves or telephone network. As regards the utilization of broadcasting waves, in addition to the experimental character multiplexed broadcasting in Great Britain called "TELETEXT", development tests are new effected in many countries on audio multiplexed broadcasting and on character multiplexed broadcasting. On the other hand, as regards the utilization of telephone network, development tests called "PRESS-TEL" have been exercised by the British Post Office and have gained public favor.

The present invention relates to multiple information service systems in which the telephone communication and the TV broadcasting, each being one of fundamental media of nation-wide scale, are combined into one and which can provide various information such as picture image or data.

As the approach to multipurpose utilization of broadcasting, telephone and the like, there can be considered the following manners: (1) effective utilization of the existing communication networks, (2) development of regional small-scale systems for the public, and (3) prevalence of individual private systems. As examples effectively utilizing the existing communication networks, there are known such systems in Great Britain as called CEEFAX or PRESS-TEL (VIEWDATA), which employ effectively the existing communication media such as broadcasting waves or telephone network. As the regional small-scale systems for the public, PYRAMID system of Ampex Corp. and "Interactive Cable Vision" of Mitre Corp. have been tested in U.S.A.

However, the above-mentioned PRESS-TEL system in Great Britain is such that the information requested through a telephone circuit from a terminal is data-transmitted to the terminal again through the telephone circuit go display a desired picture image on a terminal color TV receiver or a special display device having display and telephone functions. In this system, character codes and picture element indicating codes which employ a part of the character codes are transmitted from the center to a terminal to form and display one picture image by means of a character generator provided in the terminal. Therefore, this system has drawbacks that it is impossible to transmit any stationary picture and that the terminal inevitably becomes expensive. Incidentally, the ANTIOPE system, which has been put into practical use in France, is the same kind as the above-mentioned PRESS-TEL system.

Further, in the PYRAMID system developed by Ampex Corp. for a video/audio information searching system in school, respective information from a video information source such as a TV camera provided in the center and from an audio information source such as a microphone is at once stored in video and audio masters. In response to a request from a terminal, video and audio signals for one frame, which are randomly picked up from the above masters, are first transferred to video and audio buffer memories and then transmitted to the terminal. However, because of a lack of exchange function on the center side, this system has drawbacks that it is wanting in expansibility, that its utilization is limited to a narrow region and that the center is expensive when viewed from the terminal.

Further, one of two kinds of TICCIT system developed by MITRE Corp. is for a very narrow region such as school and the other is for a small area covering about 2000 terminals. Each system operates as follows. In response to a request from a terminal, digital character signals are outputted from a character generator controlled by a computer, and the signals for one frame are at once stored in a refresh memory. The stored signals are transformed into video signals through the repeating regeneration and are transmitted, after the modulation by a modulator, to a plurality of terminals through a single coaxial cable. However, it is impossible for the system to produce analog half-tone since the digital character signals are formed and used. Further, the system is great in division loss and is wanting in expansibility and in effect due to large grouping, since it has no exchange function. Although, in view of the above-mentioned, a hub system is used, the cost of the center side viewed from terminals is as high as in the PYRAMID system. Further, the system is small in expansibility as compared with systems utilizing the existing public circuit, since the video information and the audio information are transmitted through respective transmission lines.

BRIEF DESCRIPTION OF DRAWINGS

Now, the present invention as well as the prior art system will be explained referring to the accompanying drawings, in which:

FIGS. 4A and 4B are detailed block diagrams for explaining each block shown in FIGS. 2 and 3 in more detail;

FIG. 6 is a flow chart explaining the procedure for starting the desired service.

DETAILED DESCRIPTION

Figure 1:
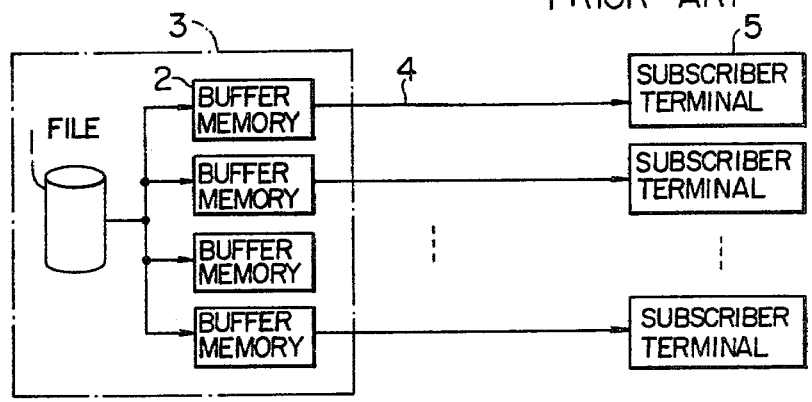
FIG. 1 is a block diagram showing a conventional picture/audio transmission system.

The essential features of the above-mentioned prior art techniques can be shown by FIG. 1. In the figure, a center 3 includes therein a picture/audio file 1 and picture/audio buffer memories 2, and is connected with subscriber terminals 5 through subscriber transmission paths 4. The data transmission from the picture/audio file 1 to the picture/audio buffer memories 2 is performed in a short time. For example, in the picture system, a picture image for one frame is transmitted from the picture file to the picture buffer memories and stationary pictures are continuously outputted from the picture buffer memories. In the audio system, on the other hand, time axis compressed high-speed audio information is transmitted from the audio file to the audio buffer memories and is then subjected to the velocity transformation in the audio buffer memories to deliver audio signals at low speed. Since the center 3 is connected to the subscriber terminals 5 by the subscriber transmission paths 4, the system of the above kind has a drawback that subscriber transmission paths become expensive when the distance between the center 3 and each of the subscriber terminals 5 is elongated.

An object of the present invention is to eliminate the above drawbacks of prior art techniques and to reduce the total cost of the system.

A further object of the present invention is to reduce the length of each of a large number of subscriber transmission paths by transferring picture/audio buffer memories included in the center into subcenters located near subscribers, thereby cutting down the total cost of the system.

A still further object of the present invention is to provide an improved system which has the exchange function in each subcenter and utilizes the existing networks and which is therefore small in division loss, great in effect due to large grouping and excellent in expansibility.

According to the present invention, there is provided a picture/audio signal transmission system comprising a center including therein a picture and audio file, buffer memory means, subscriber terminals and subscriber transmission path means, the picture and audio information from said picture and audio file being transmitted to said subscriber terminal, wherein a subcenter including therein picture and audio buffer memory means is provided between said center and said subscriber terminal.

Figure 2:
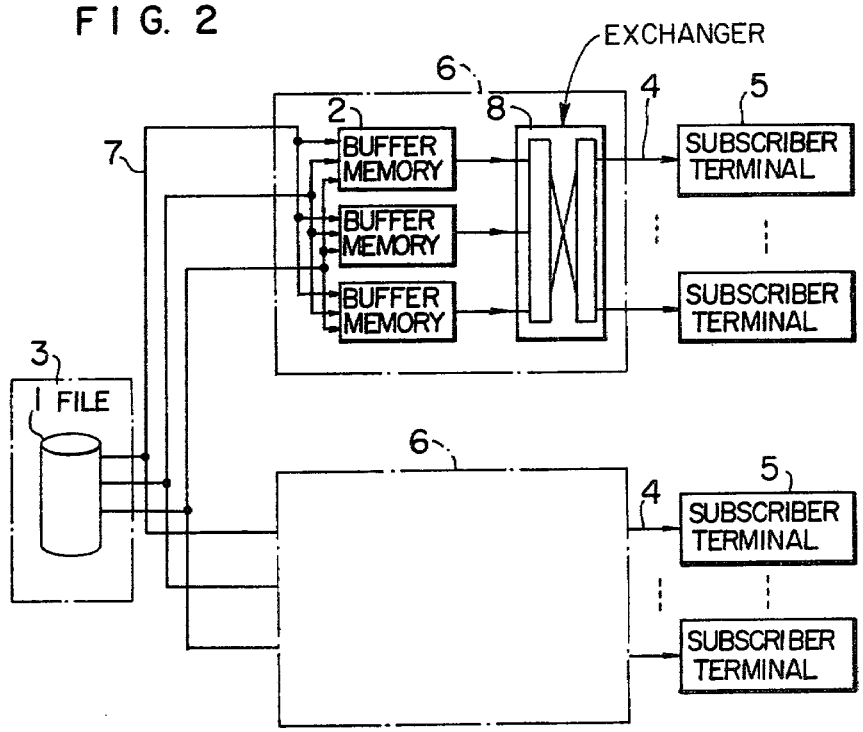
FIG. 2 is a block diagram showing an embodiment of a picture/audio transmission system according to the present invention, in which a center is connected to each subcenter by means of a plurality of time division transmission paths provided in accordance with the kind of signal.

The present invention will be explained in more detail mainly with respect to picture signal system, using embodiments shown in FIGS. 2 and 3 mainly showing the video signal system and excepting the audio signal system. Referring to FIG. 2, a center 3 includes a picture/audio file 1. Picture/audio buffer memories 2 and an exchanger 8 are included in each of subcenters 6 located near subscriber terminals 5. Between the center 3 and the subcenter 6 are provided transit paths which form transmission paths corresponding to the kind of signals, and each signal is transmitted through the corresponding transmission path in a time-divisional fashion and at high speed. Such a signal is transmitted in a state in which audio and control signals are time axis-compressed in the same signal form as an analog baseband TV signal. For example, three kinds of signals consisting of video, audio and control signals, each of which is transmitted in a time-divisional fashion, are space-divisionally transmitted. For another example, four kinds of signals consisting of luminance video, chrominance video, audio and control signals, each of which is transmitted in a time-divisional fashion, are subjected to space division transmission. Also, there can be employed a further example in which more than five kinds of signals are transmitted in a space-divisional fashion. Further, there is possible a case in which one or two kinds of signals are transmitted in a space-divisional fashion. In this system, since the distance between the subcenter 6 and the subscriber terminal 5 is short, the length of each subscriber transmission path 4 is small.

Figure 3:
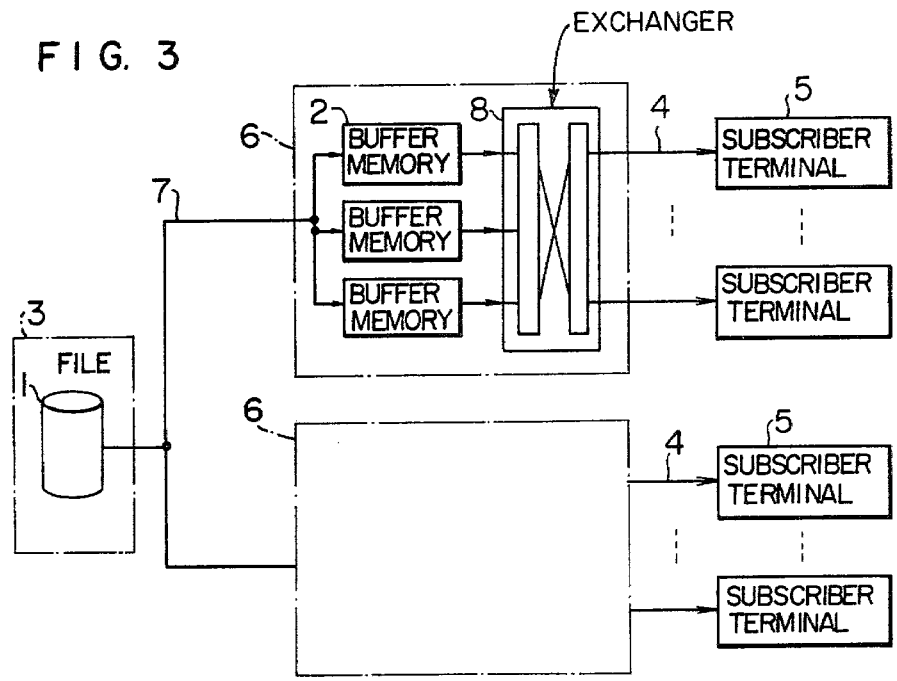
FIG. 3 is a block diagram showing a picture/audio transmission system according to a modification of the present invention in which the center is connected to each subcenter by means of a single time division transmission path.

Referring to FIG. 3 showing another embodiment of the present invention, a center 3 includes a picture/audio file 1. Picture/audio buffer memories 2 are included in each subcenter 6 located near subscriber terminals 5. Various kinds of signals are transmitted through a single transit path 7 from the center 3 to the subcenter 6 in a time-divisional fashion. For example, three kinds of signals consisting of control, video and audio signals or four kinds of signals consisting of control, luminance video, chrominance video and audio signals are time-sequentially and successively transmitted. Further, there can be employed another example in which more than five kinds of signals are time-divisionally transmitted. In the embodiment, the length of each subscriber transmission path 4 is small because of a shorter distance between the subcenter 6 and each subscriber terminal 5. Since the cost of transmission lines used in the whole system is approximately proportional to the length of subscriber transmission paths which are used in large numbers, the transmission paths of the system according to the present invention are low in cost, and therefore the total cost of the system can be also cut down.

Figure 4A:
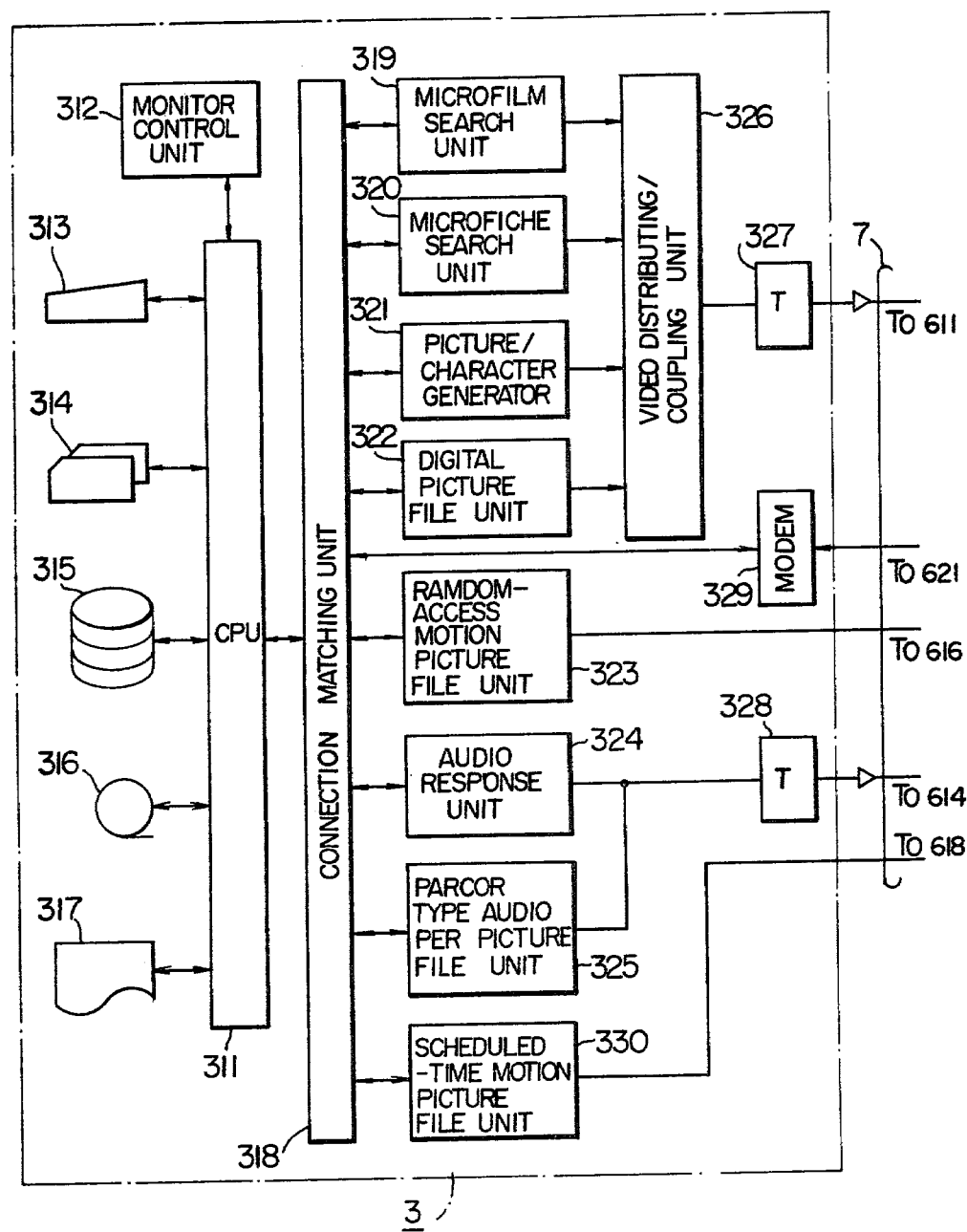

FIGS. 4A and 4B are block diagrams showing a detailed construction of each block in FIGS. 2 and 3. Referring to FIG. 4A, a center 3 includes CPU (Central Processing Unit) 311, monitor control unit 312, data typewriter 313, card reader 314, magnetic disk pack unit 315, magnetic tape unit 316, line printer 317, connection matching unit 318, microfilm search unit 319, microfiche search unit 320, picture/character generator 321, digital picture file unit 322, random-access motion picture file 323, audio response unit 324, PARCOR type audio per picture file unit 325, video distributing/coupling unit 326, video signal transmitter 327, audio signal transmitter 328, control signal transmitter (MODEM) 329 and scheduled-time motion picture file unit 330. The center 3, in which picture/audio units such as picture and audio files of various kinds are controlled by the CPU 311, has a function of sending to the subcenter 6 the information requested from the subscriber terminal 5.

Referring to FIG. 4B, the subcenter 6 includes video signal receiver 611, frame memory 612, video change-over unit 613, audio signal receiver 614, audio buffer memory 615, audio change-over unit 616, video output unit 617, audio output unit 618, exchanger 619, end office (EO) units 620, control signal receiver (MODEM) 621, multi-frequency signal receiver 622 and microcomputer 623. The subcenter 6 has a function of storing video signals sent out of the center 3, sending video signals out of the frame memory 612 at a rate of 30 pictures per second and sending audio signals out of the audio buffer memory 615. The video and audio signals are respectively sent out at color baseband of 4 MHz to the subscriber terminal 5 through the exchanger 619 and the end office units 620.

Figure 5:
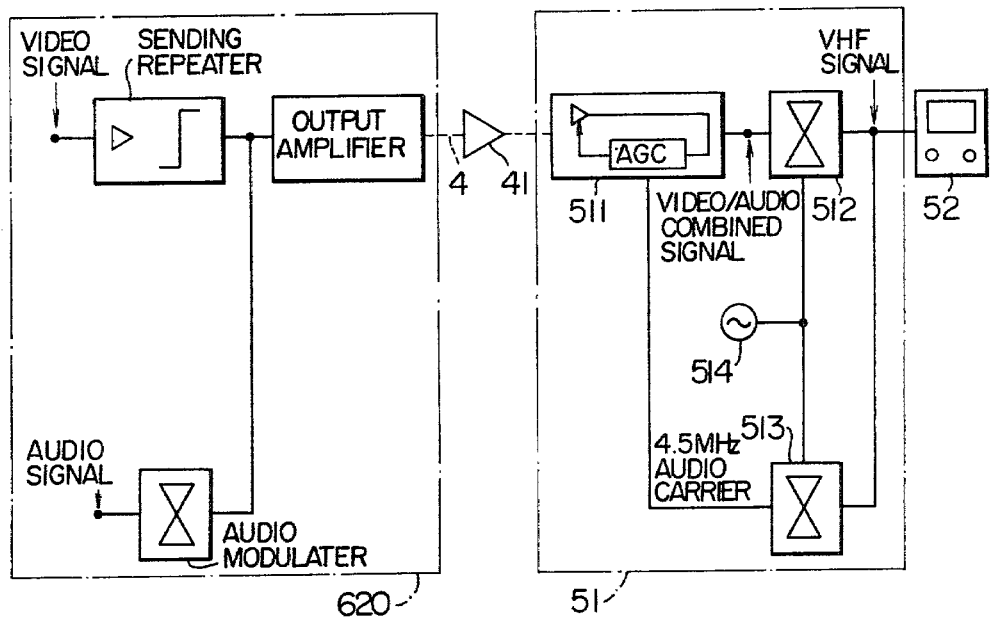
FIG. 5 is a block diagram showing a part ranging from a subcenter to a terminal of a picture/audio transmission system according to the present invention.

The transmission line 4 has a function of simultaneously sending, by means of a single transmission path, video and audio signals in which video signals at baseband and audio signals frequency-modulated to a band of 4.5 MHz outside the transmission band of video signals are superimposed as shown in FIG. 5, and of connecting them through a wideband intermediate repeater or amplifier 41 with a converter of the subscriber terminal 5.

As shown in FIG. 4B, the subscriber terminal 5 includes converter 51, TV receiver 52 and terminal controller 53 such as pushphone or simplified keyboard. As shown in FIG. 5, the converter 51 inclludes terminal repeater or amplifier 511, modulators 512, 513 and oscillator 514. The subscriber terminal 5 has a function of inputting video signals, which are subjected to equalization, amplification and frequency conversion to VHF, to a vacant channel or video input terminal of the general TV receiver 52.

Subsequently, the procedure for starting the required service will be explained in accordance with the flow chart shown in FIG. 6. In the case when picture/audio information is first requested through the subcenter 6 to the center 3, turn-on of each of power sources for the converter 51 and the TV receiver 52 is confirmed and a vacant channel (for example, channel No. 2) of the TV receiver is selected. When the terminal controller 53 such as pushphone or simplified keyboard is made off-hook, the exchanger 619 of the subcenter 6 detects calling of the subscriber terminal 5 and sends out a dial tone to the calling subscriber terminal. When the calling subscriber terminal receives the dial tone, dialing is performed to attain a circuit connection between the subscriber terminal 5 and the subcenter 6. When there is found no vacant trunk in the exchanger 619 of the subcenter 6, a busy tone is sent out of the exchanger 619 to the calling subscriber terminal 5 to be made on-hook at the calling subscriber terminal as done in a telephone set. On the other hand, when there is found a vacant trunk, the circuit connection is made.

In the subcenter 6, together with the detection of incoming, the following different operations are performed according to whether service is now going on or interrupting. That is, when service is interrupting, a subcenter out-of-operation notice is sent to the calling subscriber terminal. The like notice is also sent out for the out-of-operation of the center 3. When service is going on, both a test pattern and a signal indicating to adjust the TV receiver are sent to the calling subscriber terminal.

In the calling subscriber terminal 5, when the receiving condition of the TV receiver 52 is good or normal, the call signal (for example, ) showing the good condition of TV receiver is sent out. When the receiving condition is not good, on the other hand, the TV receiver 52 is adjusted to obtain the good condition and then the call informing the good condition of TV receiver 52 is made (for example, is pushed).

Next, in the calling subscriber terminal 5, there is inputted by means of the terminal controller 53 a service menu number (number for service connection) which is selected from a service menu prepared in the center. The service menu number is sent to the center 3 through the multi-frequency signal receiver 622, microcomputer 623, control signal receiver 621 and control signal transmitter 329 in the subcenter 6 and is processed by the CPU 311. The desired video information corresponding to the contents of request is sent, directly or through the video distributing/coupling unit 326 and the video signal transmitter 327, from one or more of the microfilm search unit 319, microfiche search unit 320, picture/character generator 321, digital picture file unit 322, random-access motion picture file unit 323 and scheduled-time motion picture file unit 330. On the other hand, the desired audio information is sent through the audio signal transmitter 328 from either one or both of the audio response unit 324 and the PARCOR type audio per picture file unit 325. Further, control signals for the frame memory 612, video change-over unit 613, audio buffer memory 615 and audio change-over unit 616 in the subcenter 6 are separately sent out through the CPU 311, connection matching unit 318 and control signal transmitter 329. The video and audio signals corresponding to the request from the subscriber terminal 5 and the control signals are transmitted through five transmission lines to the subcenter 6 in a time-divisional fashion and at high speed.

Figure 7A:
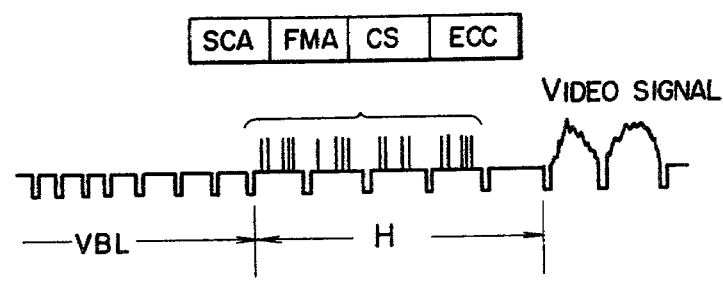
FIGS. 7A and 7B are views for explaining examples of the information transmission between the center and the subcenter.

For example, as shown in FIG. 7A, the transmission of video or picture information is carried out by superimposing subcenter address SCA, frame memory address FMA, control signal CS for control of the interruption and activation of frame memory, and error correcting code ECC, in a binary signal form, during several horizontal scanning periods H followed just after the vertical blanking signal VBL. The transmission of audio information is carried out in a usual audio multipled transmission form accompanying subcenter address and audio buffer memory address, like the transmission of picture information.

The video and audio signals are respectively received at the video signal receiver 611 and at the audio signal receiver 614, and applied to the frame memory 612 and the audio buffer memory 615 respectively. On the other hand, the control signals are received by the control signal receiver 621 and the microcomputer 623 to be applied to the frame memory 612, video change-over unit 613, audio buffer memory 615 and audio change-over unit 616, as mentioned previously. As regards video information, a stationary picture taken out of the frame memory 612 and a random-access motion picture directly sent to the video change-over unit 613 are changed over by the video change-over unit 613 and then delivered to the end office unit 620 through the video output unit 617 and the exchanger 619. As regards audio information, the audio information from the audio buffer memory 615 and the audio information for the random-access motion picture are changed over by the audio change-over unit 616 and then delivered to the end office unit 620 through the audio output unit 618 and the exchanger 619.

Figure 7B:
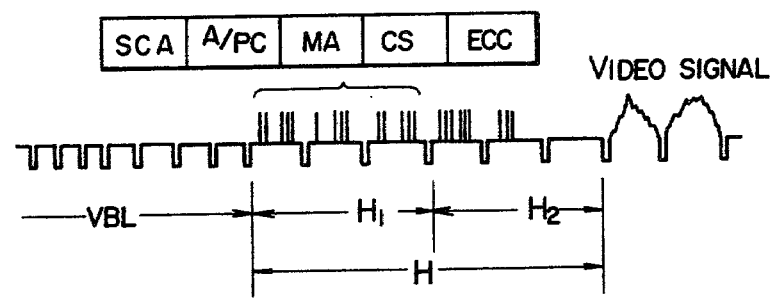

In the case where a single transmission path is used between the center 3 and the subcenter 6, the transmission may be carried out as shown in FIG. 7B. Namely, subcenter address SCA, audio/picture indicating bit A/P, frame/audio buffer memory address MA, control signal CS for control of the interruption and activation of frame/audio buffer memory, and error correcting code ECC is superimposed in a binary signal form during the former portion $H_1$ of several horizontal scanning periods H followed just after the vertical blanking signal VBL, and audio signal compressed (for example, to 1/1000) with respect to time axis is superimposed in a binary or quarternary PCM signal form during the latter portion $H_2$ of the horizontal scanning periods H.

In the end office unit 620, as is shown in FIG. 5, the video information signal and the audio modulated wave formed by modulating the audio information signal with a modulating signal of 4.5 MHz are mixed and then sent into the transmission path 4 (for example, a baseband transmission path employing a balanced, paired cable).

In the subscriber terminal 5, the video/audio information is received by the converter 51, subjected to equalization and amplification of video signal in the terminal amplifier 511, converted to NTSC color TV signal of VHF band by means of the modulators 512, 513 and the oscillator 514, and inputted to a vacant channel of the general TV receiver 52 to be reproduced.

Subsequently, service of video information or the like can be given through the subcenter 6 from the center 3 to the subscriber terminal 5 by effecting in the terminal control unit 53 such six requests as proceeding to next picture information, resending, backspace for going back to the preceding picture information, return for going back to the position of picture information at the time when the backspace starts, erasure for erasing input data, and interruption for requesting another service by interrupting the present service. The subscriber terminal 5 is made on-hook when service terminates.

In the foregoing embodiments, there have been disclosed examples employing time-division, multiplex transmission lines (wire) between the center 3 and the subcenter 6. However, it should be noted that wireless circuits such as microwave circuits as well as combined circuits of wire transmission lines and wireless circuits may be employed in place of the above-mentioned wire transmission lines.

As has been explained in the foregoing, in the present invention, the picture/audio file and the central processing unit are provided in the center, the frame memory and the exchanger are provided in the subcenter, and the center is connected to the subcenter by the time division transmission path. Consequently, the cost of transmission path can be cut down.

What is claimed is:

1. A picture/audio signal transmission system comprising:
   a plurality of subscriber units each of which includes a TV receiver, a converter for converting an analog baseband TV signal into a standard TV signal which is to be supplied to said TV receiver and a terminal controller for generating a calling signal and a request;
   a plurality of sub-centers each accommodating thereto a plurality of said subscriber units and each of which includes an exchanger responsive to the calling signal from said subscriber units accommodated and a picture and audio buffer memory means for recording a signal of analog baseband TV signal form and reproducing the signal recorded in analog baseband TV signal form, said subscriber units being connected to the corresponding accommodated one of said sub-centers by respective repeater lines; and
   a center including a plurality of picture and audio files, a central processing unit for controlling said files in accordance with the requests from said subscriber units and operatingly transmitting signals of analog baseband TV signal form in compliance with the requests, to said sub-centers in request respective separate transmission paths for picture, audio and control signals being formed between said center and sub-centers respectively, said file and said buffer memory means being connected by said transmission path.

2. A picture/audio signal transmission system according to claim 1, wherein said plural picture files and said plural audio files in said center are connected respectively through a video distributing/coupling unit and directly to picture files and audio files in said sub-centers.

3. A picture/audio signal transmission system according to claim 1, wherein said sub-center includes, between said picture and audio buffer memory means and said exchanger, a video change-over unit, an audio change-over unit, a video output unit and an audio output unit.

4. A picture/audio signal transmission system comprising:
   a plurality of subscriber units each of which includes a TV receiver, a converter for converting an analog baseband TV signal into a standard TV signal which is to be supplied to said TV receiver and a terminal controller for generating a calling signal and a request;
   a plurality of sub-centers each accommodating thereto a plurality of said subscriber units and each of which includes an exchanger responsive to the calling signal from said subscriber units accommodated, picture buffer memory means for recording a signal of analog baseband TV signal form and reproducing the signal recorded in analog baseband TV signal form, and audio buffer memory means for recording and reproducing a signal of analog signal form, said subscriber units being connected to the corresponding accommodated one of said sub-centers by respective repeater lines; and
   a center including a plurality of picture and audio files, a central processing unit for controlling said files in accordance with the requests from said subscriber units and operatingly transmitting signals of analog baseband TV signal form in compliance with the requests to said sub-centers in request, respective separate transmission paths for picture, audio and control signals being formed between said center and said sub-center respectively, said file and said buffer memory means being connected by said transmission path.

* * * * *